(12) United States Patent
Ackley

(10) Patent No.: US 8,112,711 B2
(45) Date of Patent: Feb. 7, 2012

(54) SYSTEM AND METHOD OF PLAYBACK AND FEATURE CONTROL FOR VIDEO PLAYERS

(75) Inventor: Jonathan Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2192 days.

(21) Appl. No.: 10/960,385

(22) Filed: Oct. 6, 2004

(65) Prior Publication Data

US 2005/0091597 A1 Apr. 28, 2005

Related U.S. Application Data

(60) Provisional application No. 60/509,174, filed on Oct. 6, 2003.

(51) Int. Cl.
*G06F 3/00* (2006.01)
(52) U.S. Cl. ......... 715/716; 715/717; 715/719; 715/720
(58) Field of Classification Search ........... 715/716–726
See application file for complete search history.

(56) References Cited

U.S. PATENT DOCUMENTS

| | | | |
|---|---|---|---|
| 4,333,152 A | 6/1982 | Best | |
| 4,792,895 A | 12/1988 | Tallman | |
| 4,831,541 A | 5/1989 | Eshel | |
| 5,442,744 A * | 8/1995 | Piech et al. | 715/251 |
| 5,448,315 A * | 9/1995 | Soohoo | 348/722 |
| 5,522,075 A | 5/1996 | Robinson et al. | |
| 5,548,340 A * | 8/1996 | Bertram | 348/559 |
| 5,606,374 A | 2/1997 | Bertram | |
| 5,634,850 A | 6/1997 | Kitahara et al. | |
| 5,699,123 A | 12/1997 | Ebihara et al. | |
| 5,708,845 A | 1/1998 | Wistendahl et al. | |
| 5,784,528 A | 7/1998 | Yamane et al. | |
| 5,818,439 A | 10/1998 | Nagasaka et al. | |
| 5,892,521 A | 4/1999 | Blossom et al. | |
| 5,893,084 A | 4/1999 | Morgan et al. | |

(Continued)

FOREIGN PATENT DOCUMENTS

EP 0982947 3/2000
(Continued)

OTHER PUBLICATIONS

Adve, et al., *LLVA: A Low-level Virtual Instruction Set Architecture*, in Proc. 36th Symposium on Microarchitecture, (2003 IEEE).

(Continued)

*Primary Examiner* — Tadeese Hailu
(74) *Attorney, Agent, or Firm* — Farjami & Farjami LLP

(57) ABSTRACT

A method and a system of displaying a user interface to control playback and features that may be associated with a prerecorded media. A media player, such as a DVD player, a personal computer, a home media server, a high definition video player, an optical player, a hard drive based player, or a software DVD-ROM player receives streams of video from different media and displays its content. Simultaneously, and without interrupting the video playback, a user interface is overlaid on the video image. The user interface may include menu selections to control the playback of the video including scene selection, settings, and viewing rights. The user interface may include menu selections to control features associated with the video such as Documentaries, Games, Purchases, Activities, Commentaries, Outtakes, Karaoke, Trailers, Songs, Wishlists, and Events.

16 Claims, 14 Drawing Sheets

U.S. PATENT DOCUMENTS

| | | | |
|---|---|---|---|
| 5,929,849 A | 7/1999 | Kikinis | |
| 5,956,092 A | 9/1999 | Ebihara et al. | |
| 5,987,509 A | 11/1999 | Portuesi | |
| 6,049,333 A * | 4/2000 | LaJoie et al. | 715/718 |
| 6,069,669 A | 5/2000 | Park et al. | |
| 6,154,771 A * | 11/2000 | Rangan et al. | 709/217 |
| 6,188,398 B1 * | 2/2001 | Collins-Rector et al. | 725/37 |
| 6,262,724 B1 * | 7/2001 | Crow et al. | 715/723 |
| 6,262,746 B1 | 7/2001 | Collins | |
| 6,307,550 B1 * | 10/2001 | Chen et al. | 345/418 |
| 6,357,042 B2 * | 3/2002 | Srinivasan et al. | 725/32 |
| 6,362,816 B1 | 3/2002 | Kawanami et al. | |
| 6,373,500 B1 | 4/2002 | Daniels | |
| 6,407,779 B1 | 6/2002 | Herz | |
| 6,493,038 B1 | 12/2002 | Singh et al. | |
| 6,539,240 B1 | 3/2003 | Watanabe | |
| 6,570,587 B1 | 5/2003 | Efrat et al. | |
| 6,602,297 B1 * | 8/2003 | Song | 715/210 |
| 6,868,449 B1 * | 3/2005 | Miyamoto et al. | 709/226 |
| 6,882,793 B1 * | 4/2005 | Fu et al. | 386/241 |
| 6,948,131 B1 * | 9/2005 | Neven et al. | 715/753 |
| 7,027,101 B1 * | 4/2006 | Sloo et al. | 348/564 |
| 7,043,726 B2 | 5/2006 | Scheetz et al. | |
| 7,051,005 B1 | 5/2006 | Peinado et al. | |
| 7,069,311 B2 * | 6/2006 | Gupta et al. | 709/219 |
| 7,162,531 B2 * | 1/2007 | Paz et al. | 709/231 |
| 7,178,161 B1 * | 2/2007 | Fristoe et al. | 725/86 |
| 7,210,144 B2 | 4/2007 | Traut | |
| 7,281,220 B1 * | 10/2007 | Rashkovskiy | 715/838 |
| 7,313,808 B1 * | 12/2007 | Gupta et al. | 725/89 |
| 7,624,337 B2 * | 11/2009 | Sull et al. | 715/201 |
| 7,809,802 B2 * | 10/2010 | Lerman et al. | 709/217 |
| 2001/0021926 A1 | 9/2001 | Schneck et al. | |
| 2001/0056434 A1 * | 12/2001 | Kaplan et al. | 707/104.1 |
| 2002/0037159 A1 * | 3/2002 | Goto et al. | 386/69 |
| 2002/0054049 A1 | 5/2002 | Toyoda et al. | |
| 2002/0059456 A1 | 5/2002 | Ha et al. | |
| 2002/0060750 A1 * | 5/2002 | Istvan et al. | 348/569 |
| 2002/0071886 A1 * | 6/2002 | Asai et al. | 425/543 |
| 2002/0082730 A1 * | 6/2002 | Capps et al. | 700/94 |
| 2002/0083449 A1 | 6/2002 | Im | |
| 2002/0097255 A1 | 7/2002 | Toyoda et al. | |
| 2002/0097280 A1 | 7/2002 | Loper et al. | |
| 2002/0138851 A1 | 9/2002 | Lord et al. | |
| 2002/0141582 A1 | 10/2002 | Kocher et al. | |
| 2002/0161996 A1 | 10/2002 | Koved et al. | |
| 2002/0162117 A1 | 10/2002 | Pearson et al. | |
| 2002/0169987 A1 | 11/2002 | Meushaw et al. | |
| 2002/0184520 A1 | 12/2002 | Bush et al. | |
| 2002/0194612 A1 | 12/2002 | Lundberg et al. | |
| 2002/0196370 A1 * | 12/2002 | Dagtas et al. | 348/600 |
| 2003/0046557 A1 * | 3/2003 | Miller et al. | 713/186 |
| 2003/0093790 A1 * | 5/2003 | Logan et al. | 725/38 |
| 2003/0161615 A1 | 8/2003 | Tsumagari et al. | |
| 2003/0170011 A1 * | 9/2003 | Otsuka et al. | 386/125 |
| 2003/0190950 A1 | 10/2003 | Matsumoto | |
| 2003/0196100 A1 | 10/2003 | Grawrock et al. | |
| 2004/0021684 A1 * | 2/2004 | Millner | 345/719 |
| 2004/0045040 A1 * | 3/2004 | Hayward | 725/135 |
| 2004/0047588 A1 * | 3/2004 | Okada et al. | 386/46 |
| 2004/0059996 A1 * | 3/2004 | Fasciano | 715/500.1 |
| 2004/0067048 A1 * | 4/2004 | Seo et al. | 386/126 |
| 2004/0075670 A1 * | 4/2004 | Bezine et al. | 345/619 |
| 2004/0133794 A1 | 7/2004 | Kocher et al. | |
| 2004/0175218 A1 | 9/2004 | Katzer | |
| 2004/0221311 A1 * | 11/2004 | Dow et al. | 725/52 |
| 2004/0268135 A1 | 12/2004 | Zimmer et al. | |
| 2005/0019015 A1 * | 1/2005 | Ackley et al. | 386/95 |
| 2005/0020359 A1 * | 1/2005 | Ackley et al. | 463/31 |
| 2005/0022226 A1 * | 1/2005 | Ackley et al. | 725/23 |
| 2005/0042591 A1 * | 2/2005 | Bloom et al. | 434/307 A |
| 2005/0071886 A1 * | 3/2005 | Deshpande | 725/135 |
| 2005/0223220 A1 | 10/2005 | Campbell et al. | |
| 2006/0064716 A1 * | 3/2006 | Sull et al. | 725/37 |
| 2006/0069925 A1 | 3/2006 | Nakai et al. | |
| 2006/0200842 A1 * | 9/2006 | Chapman et al. | 725/34 |
| 2007/0033419 A1 | 2/2007 | Kocher et al. | |
| 2007/0094698 A1 * | 4/2007 | Bountour et al. | 725/132 |

FOREIGN PATENT DOCUMENTS

| | | |
|---|---|---|
| EP | 1304876 | 4/2003 |
| JP | 07-222027 | 8/1995 |
| JP | 7222027 | 8/1995 |
| JP | 08-331414 | 12/1996 |
| JP | 11041563 | 2/1999 |
| JP | 2003-061039 | 2/2003 |
| JP | 2003-153140 | 5/2003 |
| JP | 2003-189220 | 7/2003 |
| JP | 2003274368 | 9/2003 |
| WO | WO 01/65832 | 9/2001 |
| WO | WO 01/73525 | 10/2001 |
| WO | 01/99403 | 12/2001 |
| WO | WO 01/99403 A2 | 12/2001 |
| WO | WO 01/99436 A2 | 12/2001 |
| WO | WO 02/17643 | 2/2002 |

OTHER PUBLICATIONS

Kocher, et al., *Self-Protecting Digital Content*, Cryptography Research, Inc., pp. 1-14 (2002-2003).

*Trusted Computing Platform Alliance (TCPA) Main Specification Version 1.1 b*, Trusted Computing Group, (Feb. 2002).

Schödl, et al., *Controlled Animation of Video Sprites*, Georgia Institute of Technology college of Computing, pp. 121-127, 196 (2002).

* cited by examiner

SYSTEM AND METHOD OF PLAYBACK AND FEATURE CONTROL FOR VIDEO PLAYERS

RELATED APPLICATIONS

This application claims the priority benefit of U.S. Provisional Application No. 60/509,174, filed Oct. 6, 2003, entitled "Next Generation DVD Functions and Features", the content of which is incorporated by reference in its entirety.

This application is also related U.S. Utility patent application Ser. No. 10/859,885 entitled "System and Method of Video Player Commerce"; to U.S. Utility patent application Ser. No. 10/859,732 entitled "System and Method of Video Player Commerce"; U.S. Utility patent application Ser. No. 10/860,572 entitled "System And Method Of Interactive Video Playback"; U.S. Utility patent application Ser. No. 10/859,888 entitled "System And Method Of Dynamic Interface Placement Based On Aspect Ratio"; and U.S. Utility patent application Ser. No. 10/859,887 entitled "Video Playback Image Processing"; all of which were filed concurrently on Jun. 2, 2004, and incorporated by reference herein in their entirety.

BACKGROUND OF THE DISCLOSURE

1. Field of the Art

The disclosed art relates to new systems and methods for providing advanced functionality in DVDs.

2. General Background and State of the Art

Today's DVDs currently have a main menu system which offers the user several options, such as making selections for what content to view on the DVD, as well also other functionality. The main menu is usually displayed when the DVD is first inserted into a player. The user can choose to view the main features, or other additional features available for viewing. The user may also be able to select various options such as audio, language, or screen size settings.

Generally, if the user desires to make a selection from the main menu, for example, to change an option during playback, playback is interrupted and the user is returned to the main menu to make the selection.

SUMMARY OF THE DISCLOSURE

The present disclosure provides a user friendly navigation scheme to media and media players. The disclosure provides for a menu system that overlays the video on a DVD, and can be viewed and selections made during viewing of a video stream. The system and method applies to media players, including but not limited to DVD players, software DVD-ROM players, high definition video players, hard drive based players, optical players, personal computers, or any other media player known to one of ordinary skill in the art.

The menu system may offer a plurality of options to the user. For example, the menu system may offer menu options normally available from the main menu screen of a DVD. In one embodiment, a user interface is provided to the user for selecting from a plurality of scene selections available within the media. The user is able to scroll through the scene selections, perhaps viewed as thumbnail images, during and without interrupting playback of the media. Once a scene is selected, the media player automatically plays the selected scene.

In another embodiment, the menu system may include functions to control playback and features of the media. The menu system in accordance with the present disclosure also provides additional features and functionality not previously available in DVDs.

In another aspect, the present disclosure provides for video playback devices such as DVD players, High-Definition video players, and PC DVD-ROM's with the ability to play back multiple video streams simultaneously on the same screen. The size, cropping, zoom-level, position, layer and aspect ratio of these video streams can be dynamically and independently controlled either by user input or by programmatic means.

The present disclosure expands the concept of picture-in-picture on video playback devices, such as DVD and High-Definition video players. The video player in accordance with the present disclosed art can play back multiple video streams simultaneously. The placement, aspect ratio, cropping, scale, transparency, tint, contrast and cropping of these video screens within the video output device can be set or adjusted arbitrarily. Furthermore, the sound mixing for each of the audio tracks accompanying the video streams may also be set arbitrarily. All of these variables can be dynamically changed during playback through either automated or user-initiated means.

It is to be understood that both the foregoing general description and the following detailed description are exemplary and explanatory and are intended to provide further explanation of the disclosed art as claimed.

BRIEF DESCRIPTION OF THE DRAWINGS

The disclosure will be better understood and objects, other than those set forth above, will become apparent when consideration is given to the following detailed description. Such description makes reference to the accompanying drawings wherein.

DETAILED DESCRIPTION

In the following description, numerous specific details are set forth in order to provide a more thorough disclosure. It will be apparent, however, to one skilled in the art, that the art disclosed may be practiced without these specific details. In some instances, well-known features may have not been described in detail so as not to obscure the art disclosed.

The present disclosure provides a user friendly navigation scheme to media and media players. The disclosure provides for a menu system that overlays the video on a DVD, and can be viewed and selections made during playback/viewing of a video stream. The menu system may offer a plurality of options to the user. For example, the menu system may offer menu options normally available from the main menu screen of a DVD. This may include selecting scenes from the media without interrupting playback of the media.

In another embodiment, the system and method add on-screen menus to control playback and features of the media. For example, controls such as play, fast forward, rewind, pause, etc. that are normally found on a remote control would be displayed on-screen and be selectable by the user. Therefore, the menu system provides an alternate method of controlling playback of media from the standard remote control. The system and method apply to video players, including but not limited to DVD players, software DVD-ROM players, high definition video players, hard drive based players, optical players, personal computers, or any other media player known to one of ordinary skill in the art.

In another embodiment, the user may guide a cursor around the video screen using a remote control, mouse, keyboard, joystick, or any other device known to one of ordinary skill in the art for directing a cursor on a screen. The cursor can be used for selecting menu options. Selecting may comprise clicking, highlighting, scrolling, and hovering. The cursor may also be utilized for relocating or resizing a window in the display. The cursor may appear as an arrow or any other shape. In one embodiment, the shape of the cursor relates to the theme of a movie. In an alternative embodiment, the cursor may substantially highlight an on-screen button or video.

Figure 1:
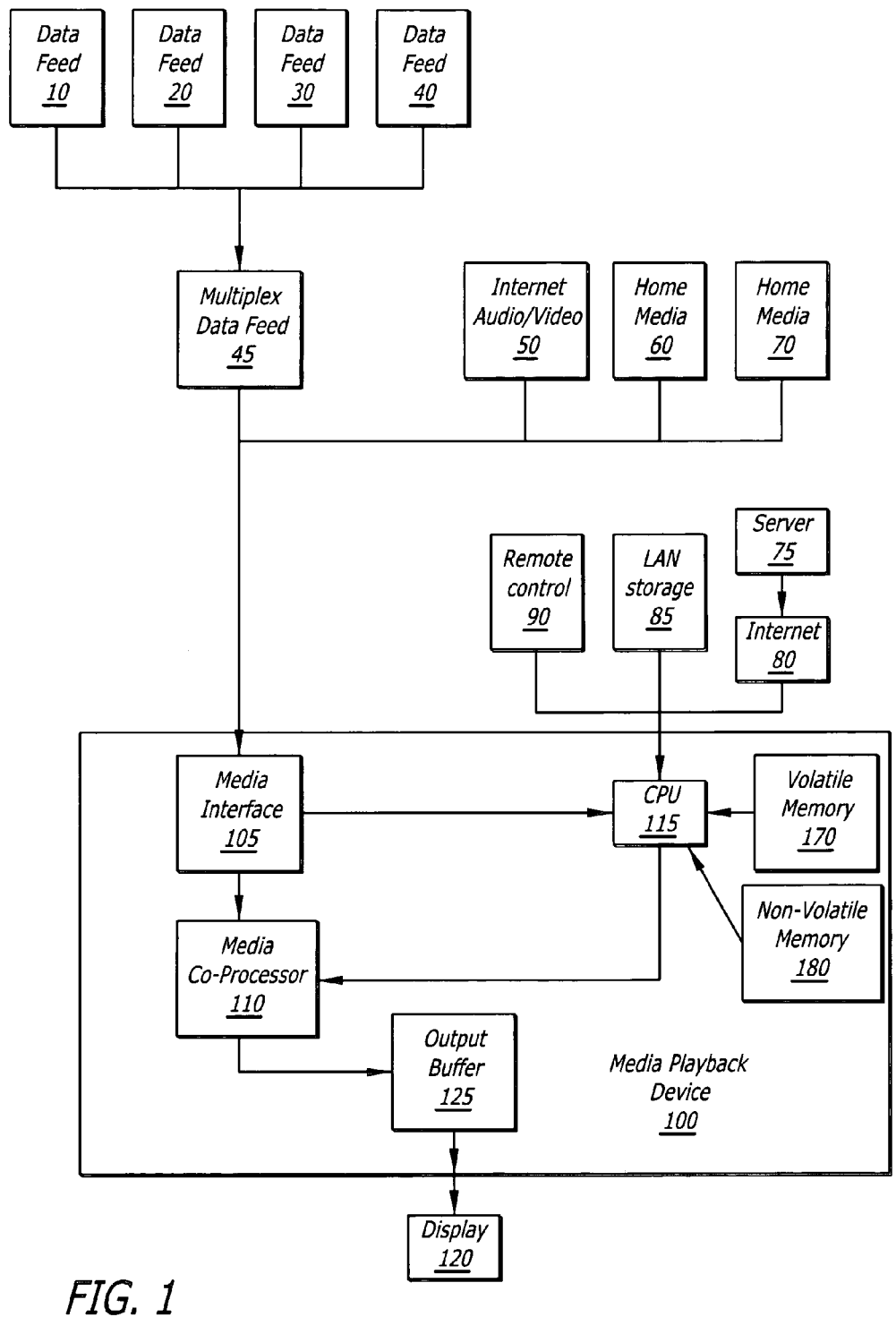
FIG. 1 is a flow diagram of the system in accordance with an illustrative embodiment incorporating features of the present disclosure.

FIG. 1 illustrates a media playback device 100. In one embodiment, the media player contains a CPU 115 and embedded software to simultaneously display menu options and stream video to a display. The menu items may be retrieved from the media in which the video is stored. Menu items may include graphics used on the video, lists of options, relations of lists of options, sounds used in hovering, alternate graphics used in hovering, etc. For example, if the video is stored in a DVD, the DVD also would contain the corresponding graphics for the menu options. Through the embedded software, the CPU 115 retrieves the menu items from the media and stores them in volatile memory 170. Alternatively, the menu items may be stored in non-volatile memory 180.

In another embodiment, generic menu items may be used. In the case where menu items are not provided within the media, the embedded software may use pre-stored menu items that would allow the user to navigate the contents of the video media through an on-screen guide. The CPU 115 may retrieve from non-volatile memory 180 generic menu items. Once the menu items and graphics necessary to control and navigate the media are loaded in memory 170, the CPU 115 would then map the contents of the media to the menu items and build an appropriate menu to navigate the contents of the media. The CPU 115 is then ready to act upon the selection of the menu options. After loading of the menu items, the CPU 115 automatically starts playing the video in the media. The user may select to invoke the available menu options if desired.

The available menu options may be invoked in different manners. In one embodiment, the CPU 115 displays a selectable menu icon. If the menu icon is selected, the CPU 115 retrieves the menu items and corresponding graphics from memory 170 and displays a list of available menu options. Once the user navigates the contents and features of the video, the user may select the menu icon again to remove the menu items being displayed on the screen. The user may select the menu icon, navigate the contents of the media, and select the menu icon again to remove the menu on the screen, while at the same time being able to continue watching the video. The user may select the a menu option through the use of a mouse or any other device that allows control of a cursor on the display 120. The mouse connects to the media playback device through a user input 160 is connected to the CPU 115 so that the CPU 115 recognizes the commands entered by the mouse.

In another embodiment, the user may invoke a menu option by depressing a button on a remote control. The remote control enters data to the CPU 115 through a user input 160. If the appropriate button on the remote control is depressed, a list of available menu options is displayed. The user may then navigate through the video and the menu options while the video is playing. The user is able to continue this activity while the video is still playing in the display 120.

In another embodiment, menu options or other selectable items in the video may appear automatically as part of a command by the embedded software within the media. For example, for scenes that have been provided with multiple angles, the video may trigger an automatic menu showing options that if selected would allow the user to view the video the scene in a selected alternate angle.

In another embodiment, an automatic menu may also appear if the video is streaming a section where the movie may take an alternate ending, or an alternate plot. Once the section in the video with an alternate plot is showing, an automatic menu would be displayed showing the possible alternate endings. The streaming of the movie would continue unless the user selects one of the options.

In another embodiment, if an item is for sale online, a menu would automatically be displayed along with options for purchasing the item. The item for sale may be pointed out by highlighting it. For instance, if a movie displays a person using a cell phone, and the cell phone is a featured item for sale, an automatic menu specific t the cell phone would appear. The menu could contain purchasing information, education information on how cell phones work, or specifications of the cell phone in the movie. In another embodiment, the featured item for sale may be highlighted in the screen and a user may click on the cell phone to view a menu specific to the cell phone.

The display of automatic menus may be set to last for a user-determined period of time. For example, a user may set the menu to last for five seconds and then disappear from the screen. A user may also remove the menu from the screen by selecting the menu icon.

In another embodiment, the menu options may be superimposed on the region of the display 120 where the video is playing. If the menu options are superimposed, the menu options may appear semitransparent so as to minimize blocking the view of any part of the displayed video. In another embodiment, the menu options may be shown in a region of the display 120 that is reserved for a menu options to appear. In other words, the region of the display 120 where the video show and the region of the display 120 where the menu shows are predetermined by the user or by the CPU 115 in the media player 100.

Alternatively, the region of the display 120 where the video is playing may be automatically reduced, thus providing space for the menu options to appear on the display 120. Once the menu is automatically removed or removed by the user, the video image is resized to its original size.

Figure 2:
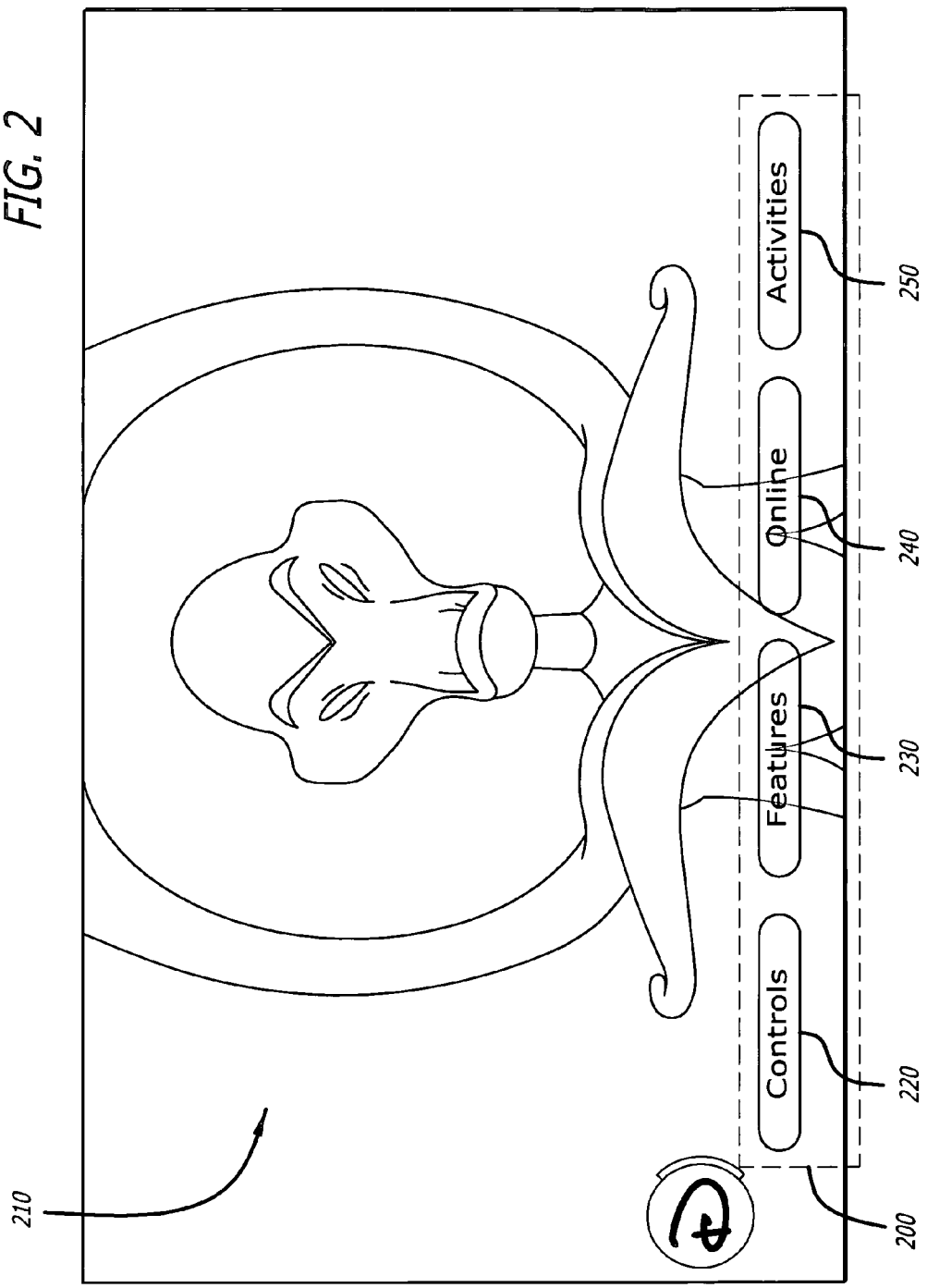
FIG. 2 is an exemplary screen shot illustrating the ability to operate an on-screen main menu and simultaneously view a video stream in an illustrative embodiment incorporating features of the present disclosure.

An on-screen menu provides a plurality of options. In an exemplary embodiment, as show in FIG. 2, a screen shot from a DVD video image illustrates a main menu 200. The main menu 200 is superimposed on top of the video stream 210, which is playing in the background. The menu may be viewed without the video streaming being interrupted. Also without playback interruption, a user may hover over menu options, navigate through submenus and select other video contents and features. The main menu 200 offers various options. One such option may be to view the playback controls 220, access available features 230, view online related material 240 or access available activities 250. The selection of an option might be enabled by pressing a particular button on a remote control or by pressing on a menu option button.

Figure 3:
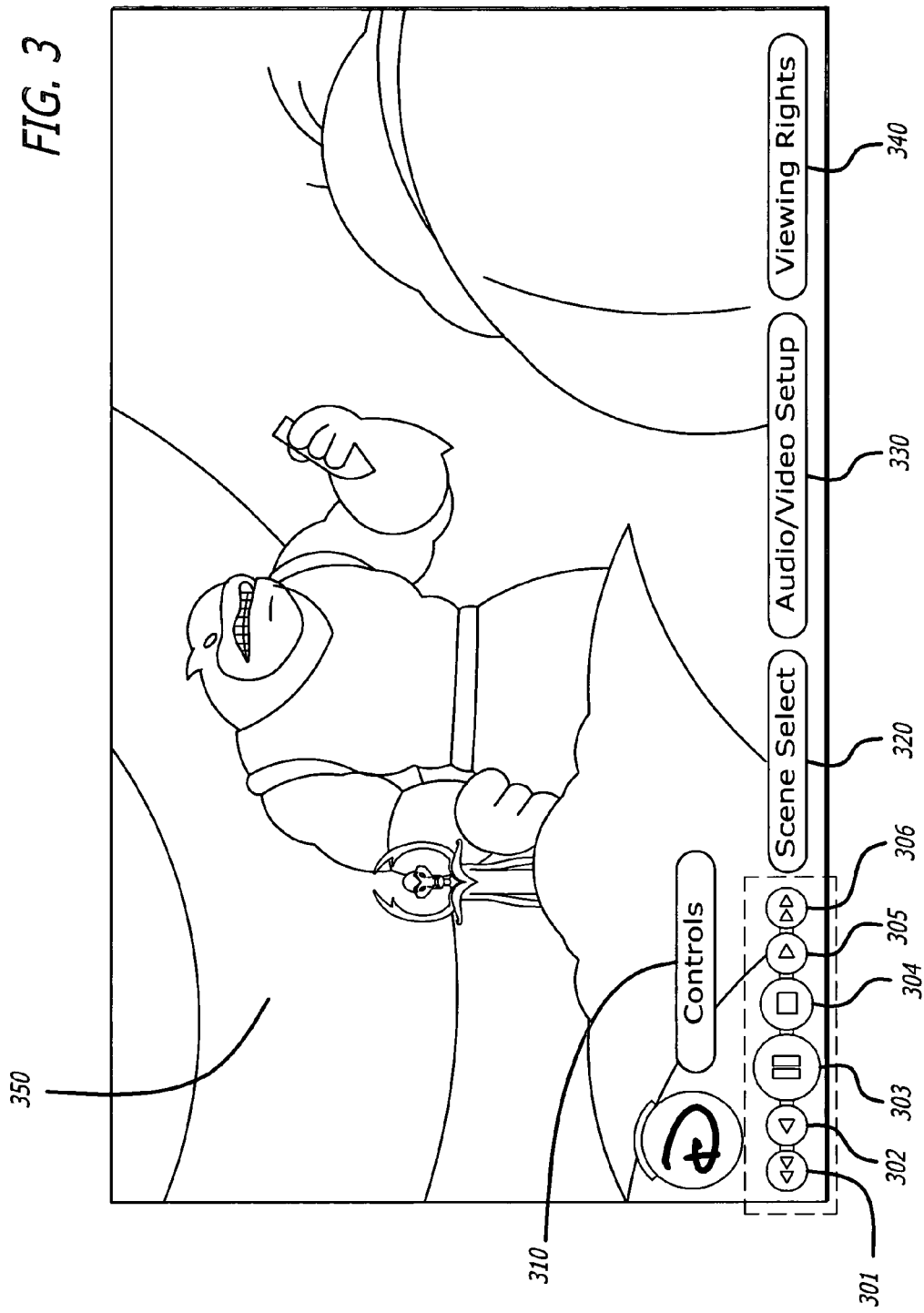
FIG. 3 is an exemplary screen shot illustrating the ability to operate an on-screen playback control menu and simultaneously view a video stream in an illustrative embodiment incorporating features of the present disclosure.

In one embodiment, the selection button may trigger a submenu to appear. For example, pressing on button labeled as "Controls" 220 may activate any available control buttons. As shown in FIG. 3, the main menu buttons disappear, and the new submenu buttons are placed on the screen. The on-screen submenu is displayed without the video streaming 350 being interrupted. The on-screen controls submenu would be composed of standard control buttons 300 such as rewind 301, previous 302, play/pause 303, stop 304, next 305, and fast forward 306. The on-screen controls submenu would also include advanced control buttons such as Scene Select 320, Audio/Video Set Up 330, and Viewing Rights 340.

Usage of the submenu controls does not interrupt video streaming 350. The user may hover on any submenu button with the video simultaneously playing. The user may select any standard playback control button 300 expecting the video streaming to be modified according to his selection. For example, if the user presses on fast forward 306, video streaming will effectively show fast forward of the video until another control option is selected or until the length of the video is consummated. In the same manner, other standard control buttons may be available to control the video playback. Standard control buttons include a play button, a pause button, a stop button, a fast forward button, a rewind button, a next button, and a back button.

Further, the user may select any advanced playback control button expecting yet another submenu. Advanced control and feature buttons include a purchase button, a documentary button, a games button, a features button, a commentaries button, a thumbnail button, or a thumbnail button with an embedded video. For example, the user may select the Scene Select button 320.

Figure 4:
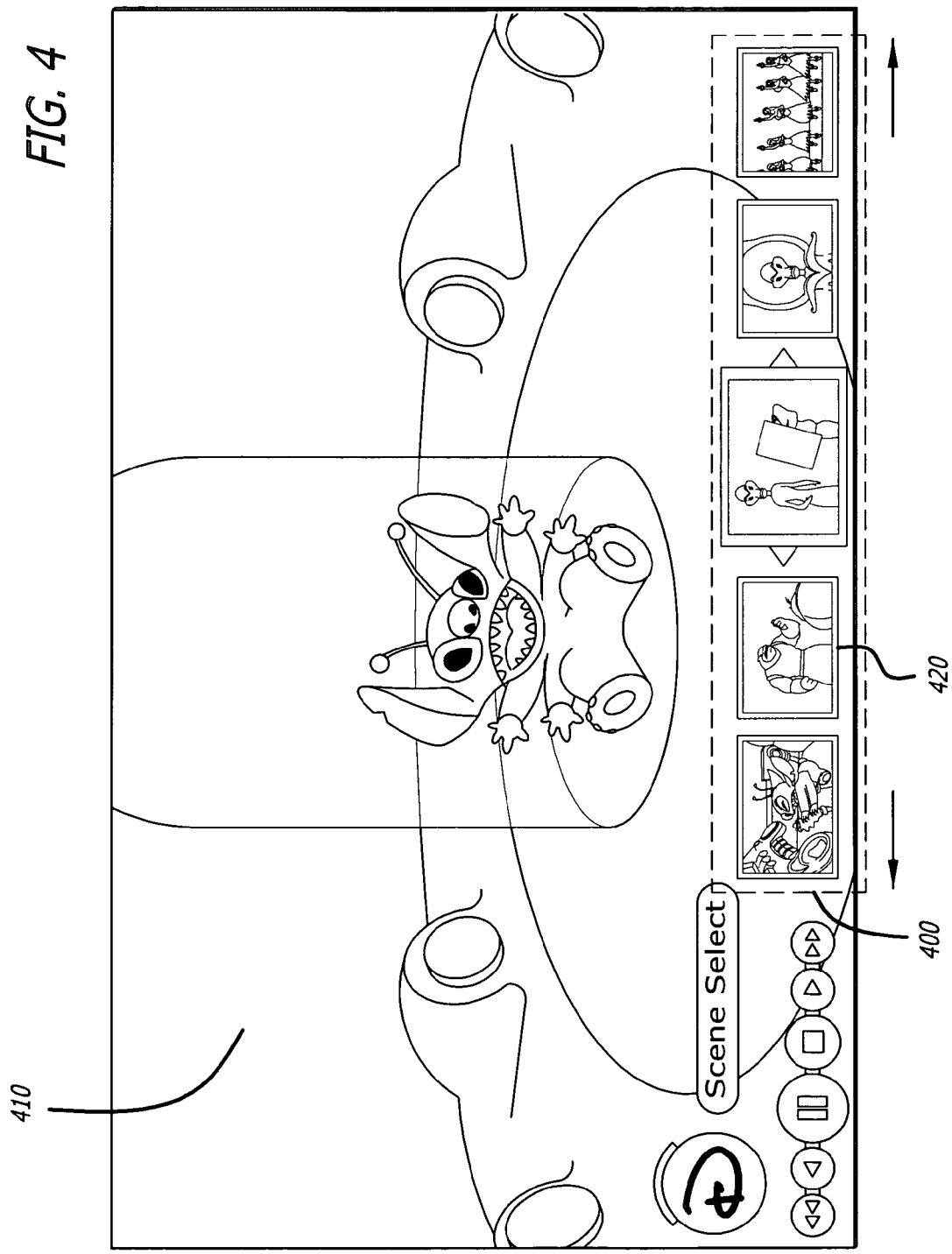
FIG. 4 is an exemplary screen shot illustrating the ability to operate an on-screen scene selection menu and simultaneously view a video stream in an illustrative embodiment incorporating features of the present disclosure.

FIG. 4 is another screen shot which illustrates an exemplary embodiment wherein scene selections can be made by the user. Once the user selects the Scene Selection button 320, another submenu 400 appears. Submenu 400 is displayed across the bottom portion of the screen and includes thumbnail buttons showing the starting frame of each available scene. The user can scroll through the thumbnails without the video stream 410 being interrupted. The user may then select a scene by pressing on the thumbnail 420.

Figure 5:
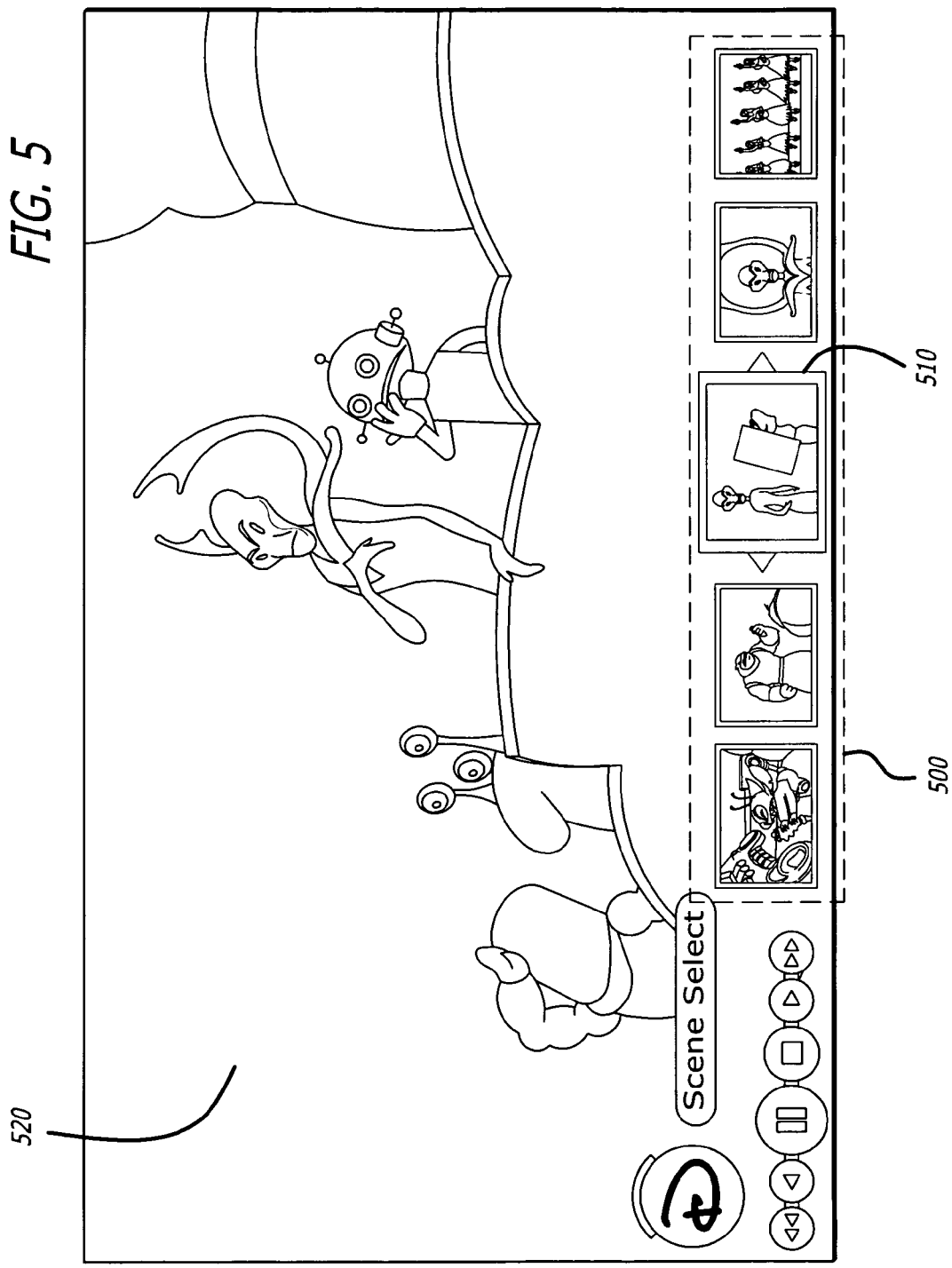
FIG. 5 is an exemplary screen shot illustrating the ability to operate an on-screen scene selection menu and simultaneously view a video stream in an illustrative embodiment incorporating features of the present disclosure.

FIG. 5 illustrates a scene thumbnail being selected from the Scene Selection menu 500. In another embodiment, when a scene thumbnail 510 is selected once, the video being played in the background 520 is automatically switched to that of the selected scene.

In another embodiment, the thumbnails in submenu 500 may be selected causing the video of the scene portrayed in the thumbnail 510 to start playing. The video would play within the thumbnail, while the main video stream 410 continues to play. If the user decides that he wants to watch the scene in full view, then he may select the thumbnail 510 again, and the selected scene will start playing as the main video stream 520. The second selection may also be achieved by a double-click on the menu thumbnail 510.

In another embodiment, thumbnails may include different video sources. In other words, each thumbnail 510 represents a different movie, a documentary, trailer, etc., originating from sources other than the media player. For instance, the media player may be connected to the Internet, and if a specific thumbnail is selected, a particular video may be downloaded from the Internet. Likewise, the video source may be a personal computer attached to the media player. The personal computer would have a hard drive with stored videos that are selectable by the media player.

Figure 6:
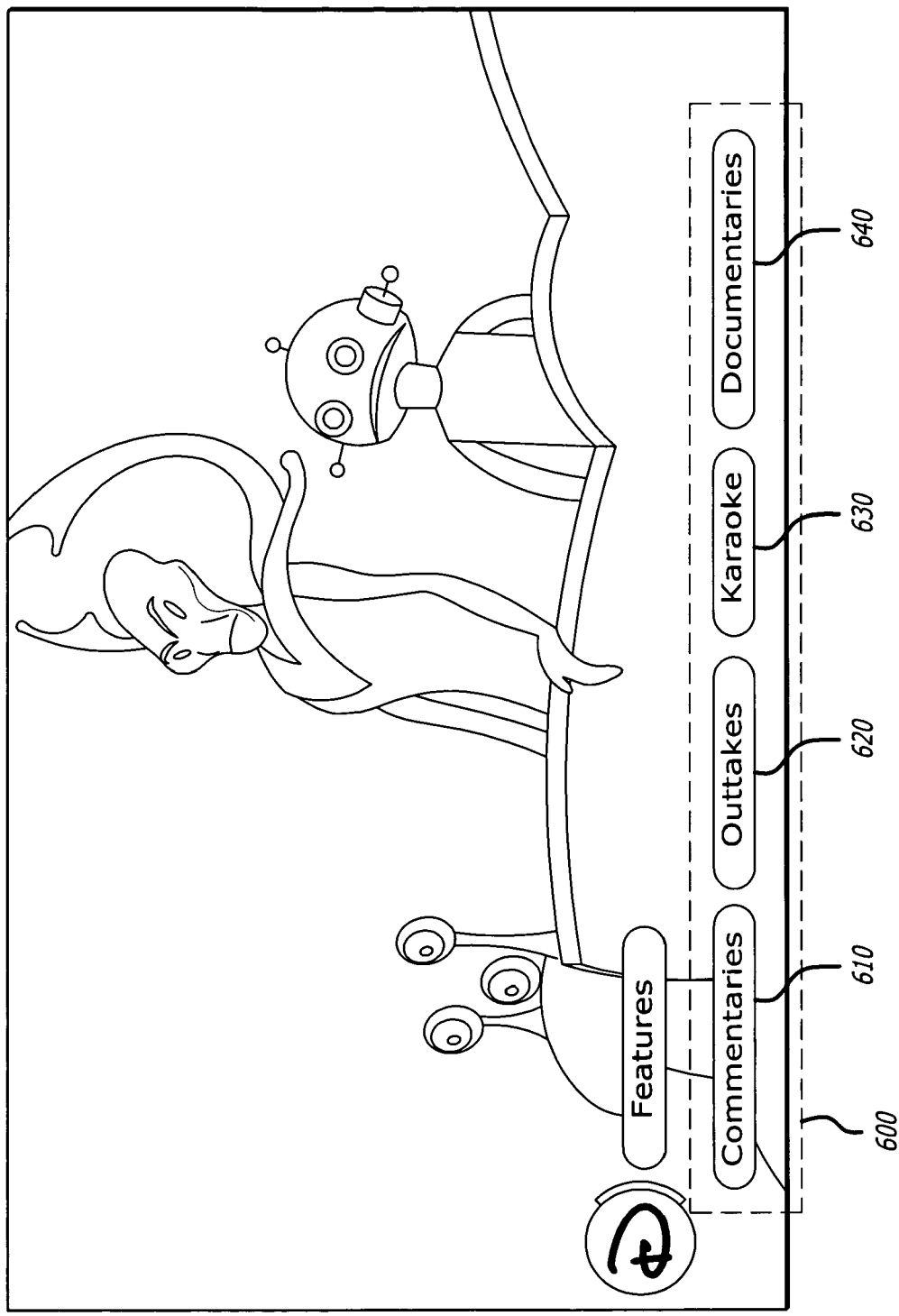
FIG. 6 is an exemplary screen shot illustrating the ability to operate an on-screen feature menu and simultaneously view a video stream in an illustrative embodiment incorporating features of the present disclosure.

The main menu displayed on the media player may include other options to access to features included in the media. FIG. 6 shows that the user has selected the option "Features" which triggered a new submenu 600 to appear. The feature submenu may include options to view additional material that is associated with the contents of the video. Such material may be commentaries accessible by selecting the "Commentaries" button 610. There may also be an option to view outtakes by selecting a button "Outtakes" 620. The "Karaoke" option 630 provides users with an option to sing along with characters or songs from the video. "Documentaries" 610 is yet another option that may be available for viewing additional content.

Figure 7:
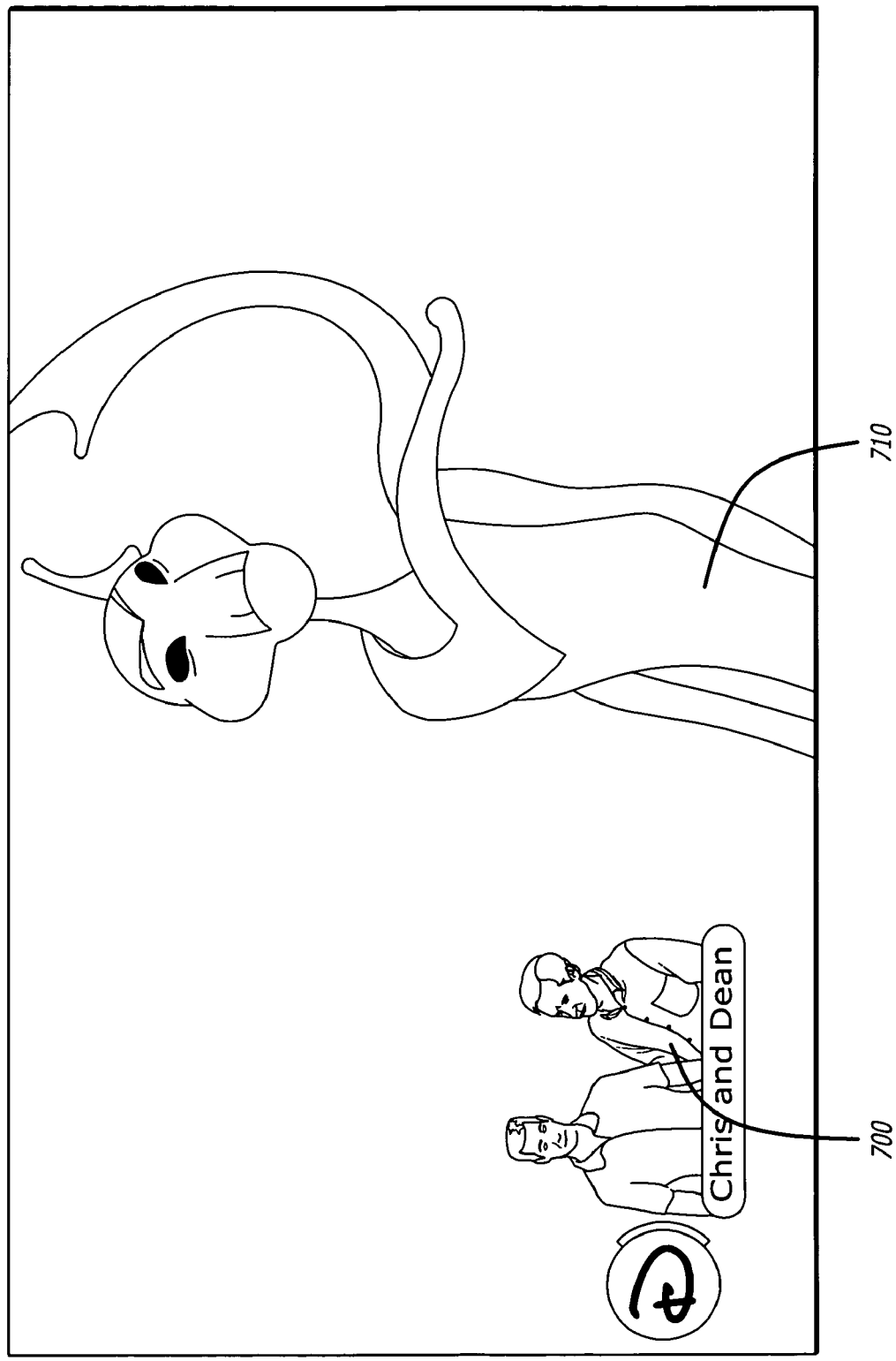
FIG. 7 is an exemplary screen shot illustrating the ability to simultaneously view multiple video streams in an illustrative embodiment incorporating features of the present disclosure.

FIG. 7 illustrates an exemplary embodiment of the art disclosed wherein the user selects to view "Commentaries" 610. The primary video stream 710 continues playing in the background while a video stream of the commentary 700 is displayed in the corner of the screen. The commentary video stream 700 may be synchronized to the video playing in the background 710, such that the commentary 700 is chronologically relevant to the portion of the primary video 710 that is playing at a given time.

Figure 8:
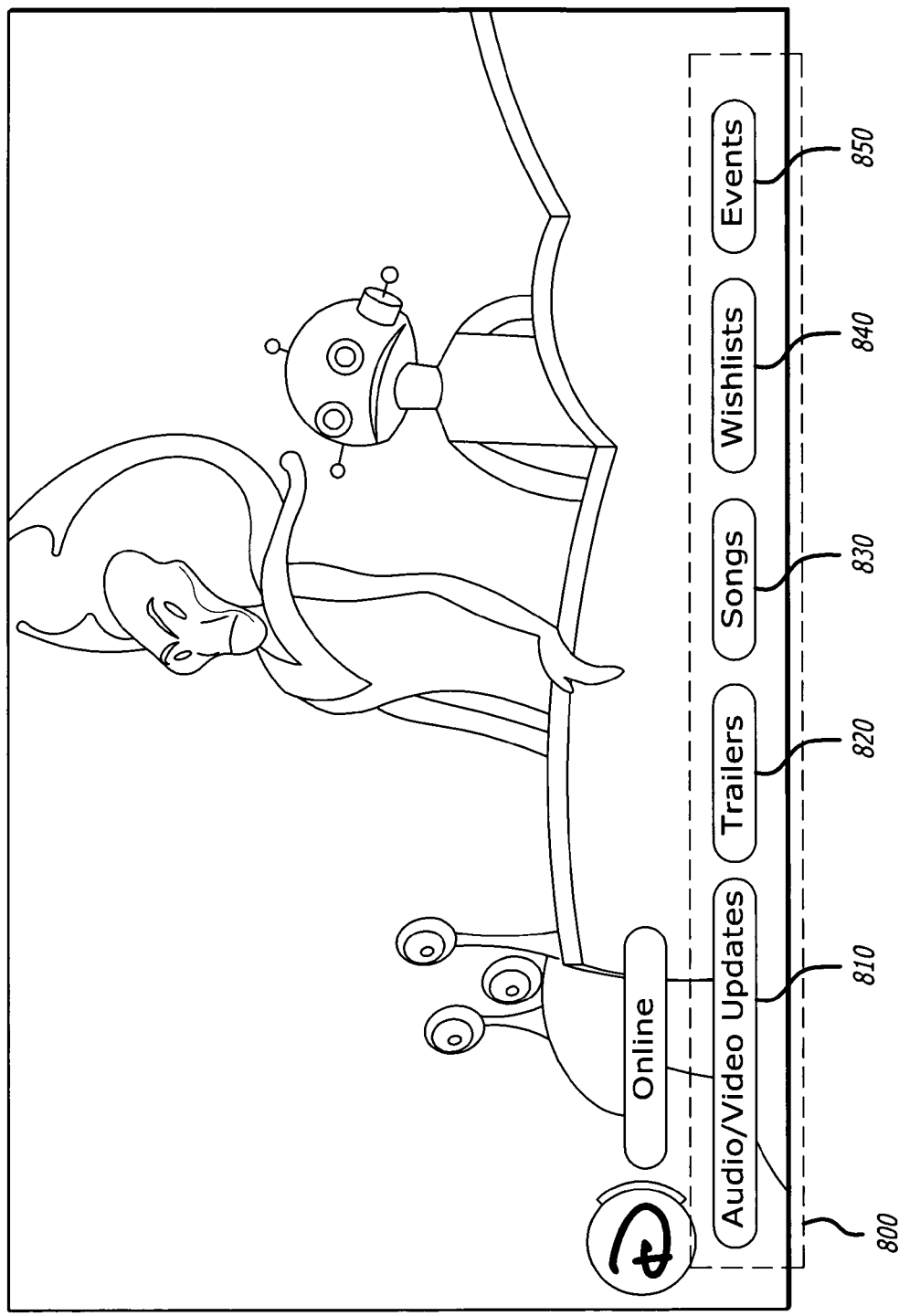
FIG. 8 is an exemplary screen shot illustrating the ability to operate an on-screen internet menu and simultaneously view a video stream in an illustrative embodiment incorporating features of the present disclosure.

In another embodiment, a main on-screen menu of the media player may include other options such as allowing the user access to online information regarding the video. FIG. 8 is an exemplary screen shot of the options available within an "Online" menu 800. The submenu 800 would provide options such as retrieving audio or video updates through a network connection. For example an online submenu may include Audio/Video Updates 810, Trailers 820, Songs 830, Wishlists 840, Events 850. A user may chose what trailer or song to download and store. Conventional DVD media, for example, included all available trailers in the media. Having online access to information associated to the video gives the user more flexibility in deciding what trailers or songs to store.

Figure 9:
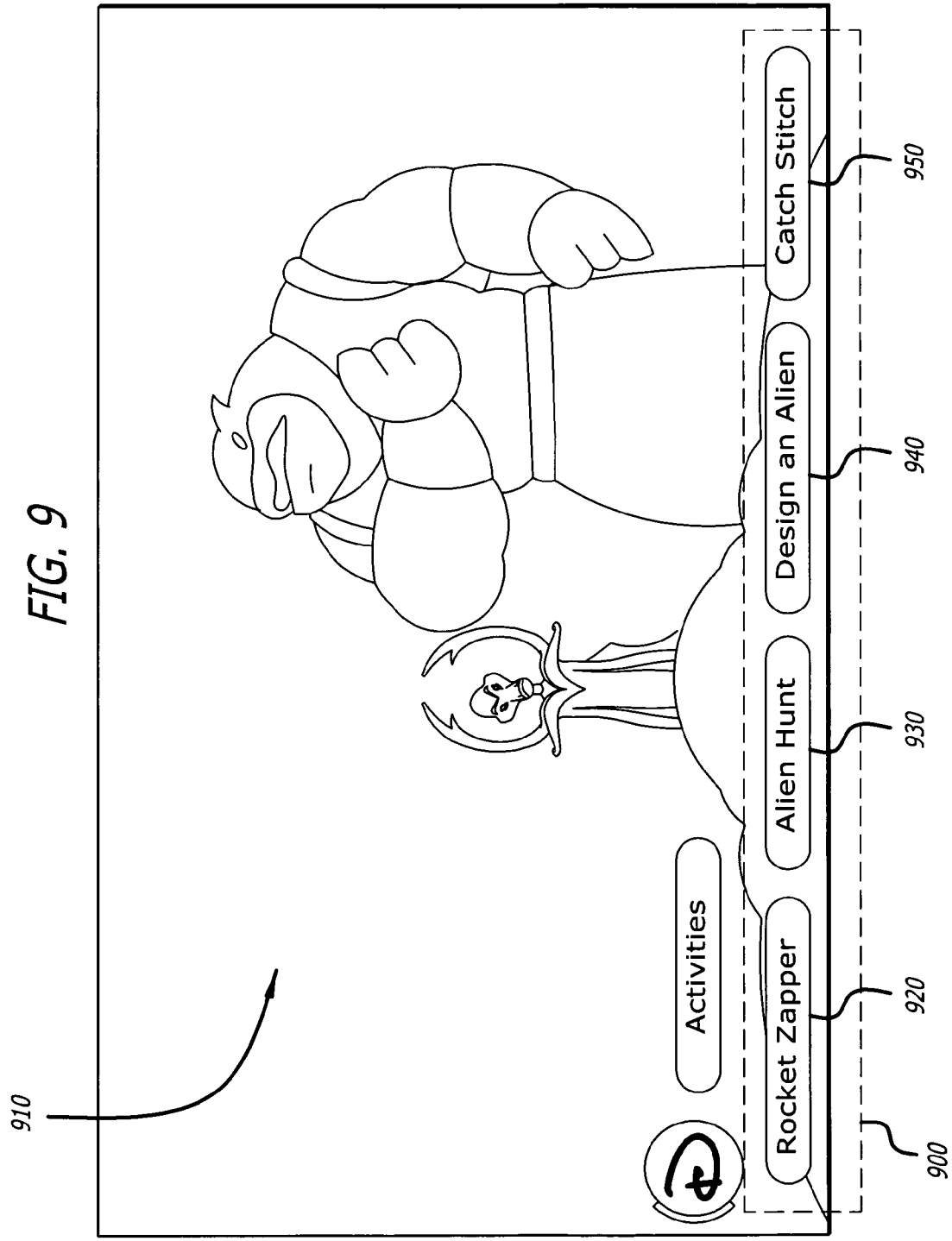
FIG. 9 is an exemplary screen shot illustrating the ability to operate an on-screen activities menu and simultaneously view a video stream in an illustrative embodiment incorporating features of the present disclosure.

In another embodiment, a main on-screen menu of the media player may include other options such as providing multiple activities associated with the video displayed. FIG. 9 is an exemplary screen shot of the options available within an "Activities" menu. The submenu 900 would provide options that would include, among other things, interactive games, puzzles, and trivia. In exemplary screen shot of FIG. 9, there are four games to choose from: "Rocket Zapper" 920, "Alien Hunt" 930, "Design an Alien" 940, and "Catch Stitch" 950.

Figure 10:
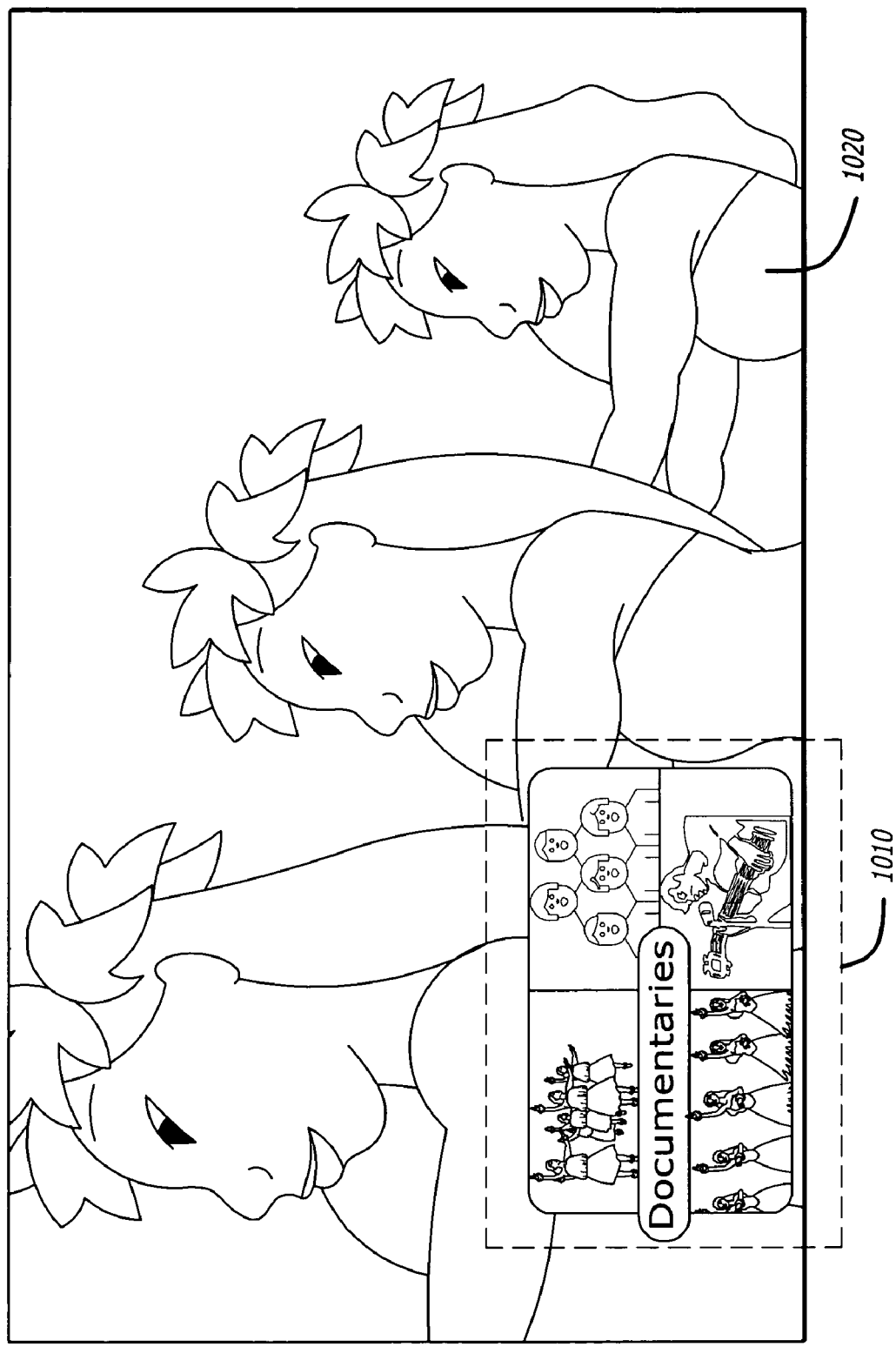
FIG. 10 is an exemplary screen shot illustrating the ability to operate an on-screen documentaries menu and simultaneously view multiple video streams in an illustrative embodiment incorporating features of the present disclosure.
Figure 11:
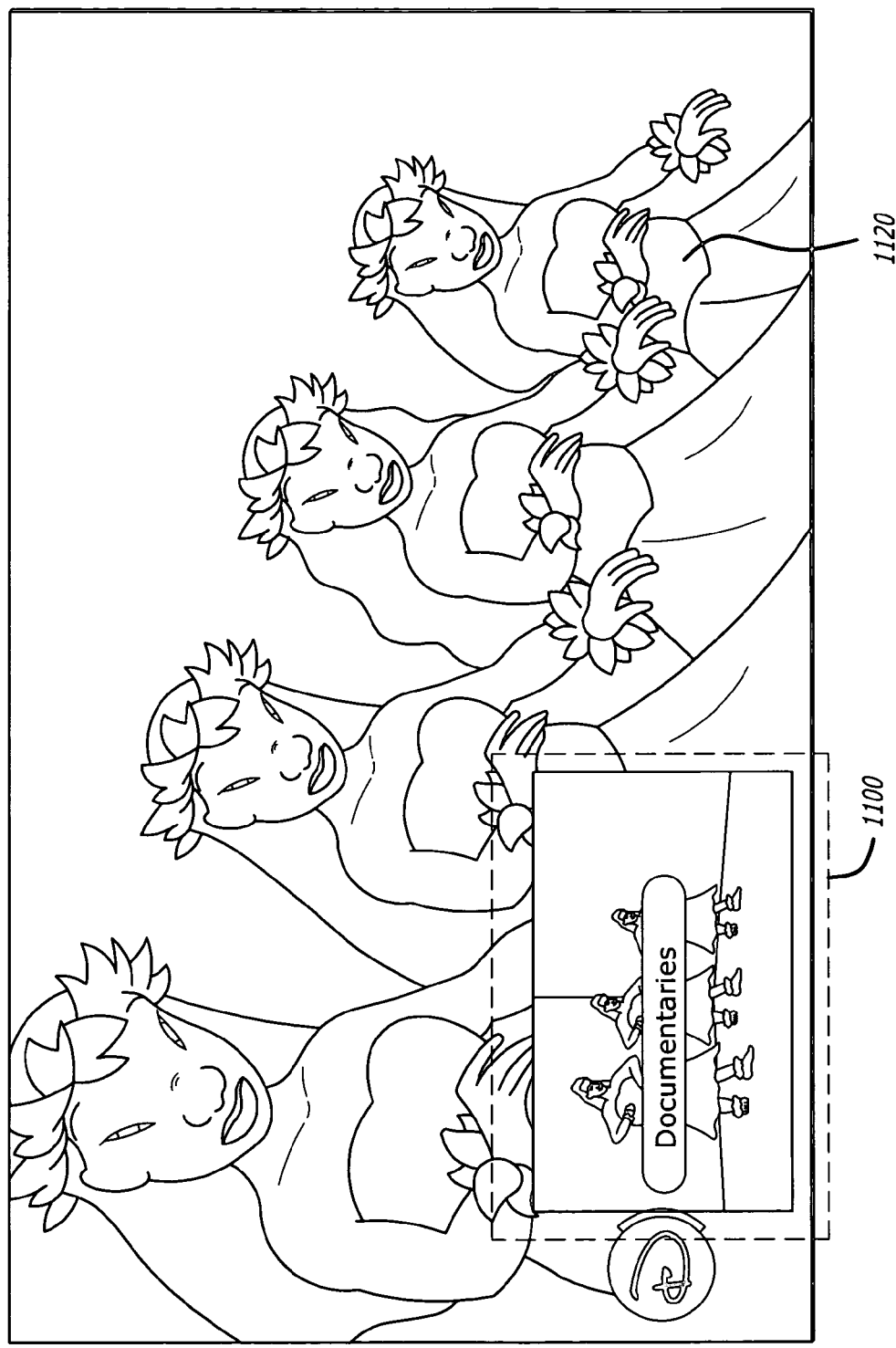
FIG. 11 is an exemplary screen shot illustrating the ability to simultaneously view multiple video streams in an illustrative embodiment incorporating features of the present disclosure.

For example, as illustrated in FIG. 10, if a user selects to view a the Documentaries menu, a window 1010 showing smaller video streams may appear and play while the primary video stream 1020 is being played in the background. In the lower left-hand corner the additional video tracks 1010 are displayed in "Multi-view Mode" as described above. The user may select one of the additional video streams using their remote control. FIG. 11 shows how a user has selected a documentary 1110 from one of the four video streams. The selected video stream is 1110 now shown alone in the window shown in the lower left-hand corner while the background primary video image continues playing 1120.

In one aspect, the media playback device 100 in accordance with the present disclosure receives at least two streams of media data. Optionally, the at least two streams of media data are streamed to the video player 100 such that the media data of a first data stream corresponds in timing to at least a second data stream. The data streams may be logically multiplexed data feeds or from multiple sources, or a combination of the two.

Data streams may be logically multiplexed data feeds, as illustrated by multiplex data feed 45. Multiplex data feed 45 is a combination of data feeds 10, 20, 30, 40 encoded in the same data feed 45. Data feeds 10, 20, 30, 40 may be transmitted from a CD, CD-ROM, DVD, DVD-ROM, television cable provider, or other data storage or transmittal device known in the art for providing multiple data streams. In an exemplary embodiment, a high definition video player contains a movie along with an additional four multiplexed video and audio tracks. These additional four multiplexed video and audio tracks contain scenes and additional material. The four multiplexed video and audio tracks are timed to match related content in the movie playing from the main video stream. Multiplexed data feed 45 may communicate with video player 100 through wireless means or a wired network.

Simultaneously, an audio and/or video feed from the Internet 50 may be transmitting to video player 100 from an Internet source. The Internet source includes a personal computer, personal media player, or other device known in the art for transmitting data from the Internet. The Internet source may communicate with video player 100 through wireless means or a wired network.

Figure 12A:
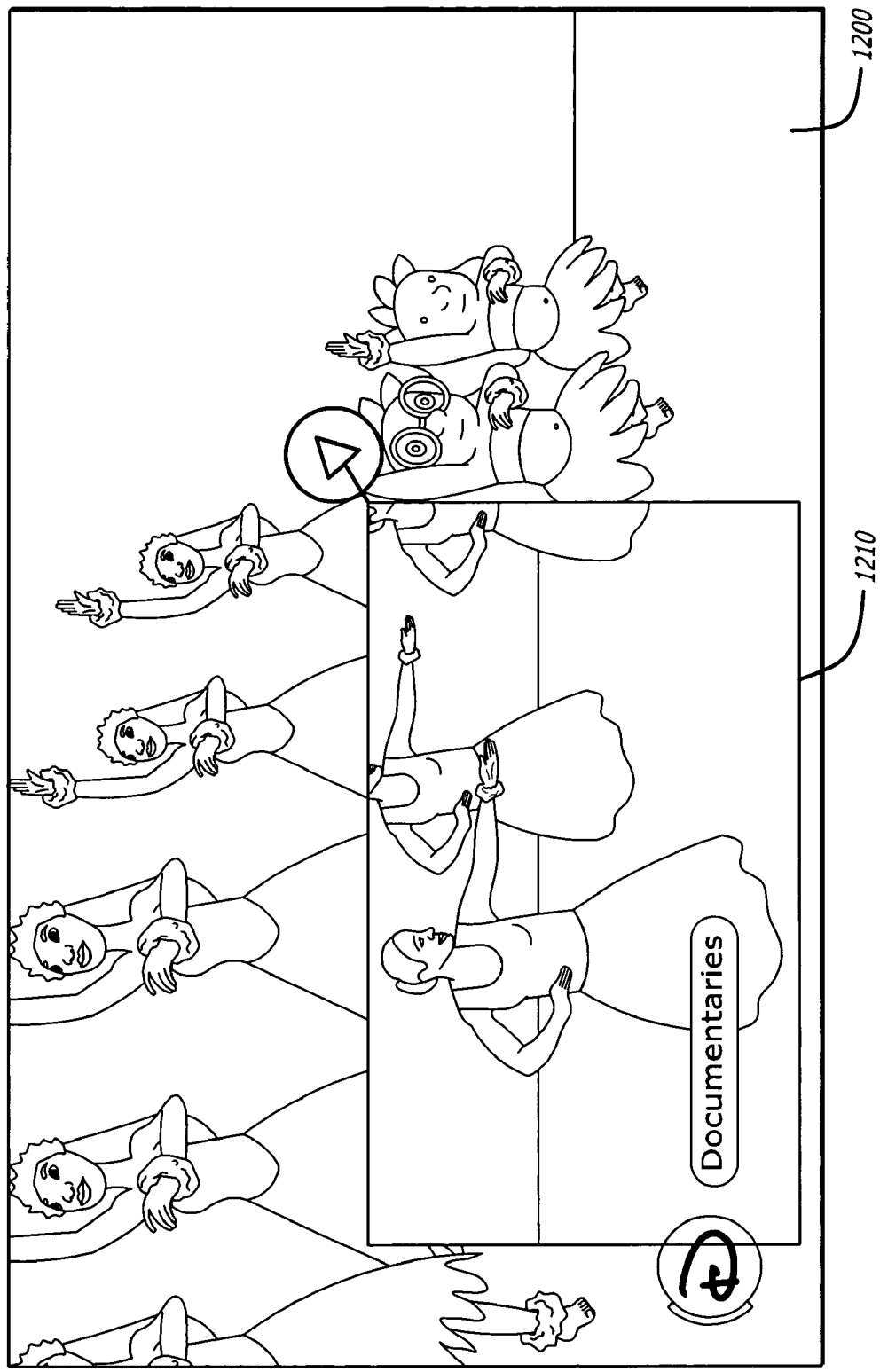
FIG. 12a-12c are exemplary screen shots illustrating the ability to operate display windows and simultaneously view multiple video streams in an illustrative embodiment incorporating features of the present disclosure.
Figure 12B:
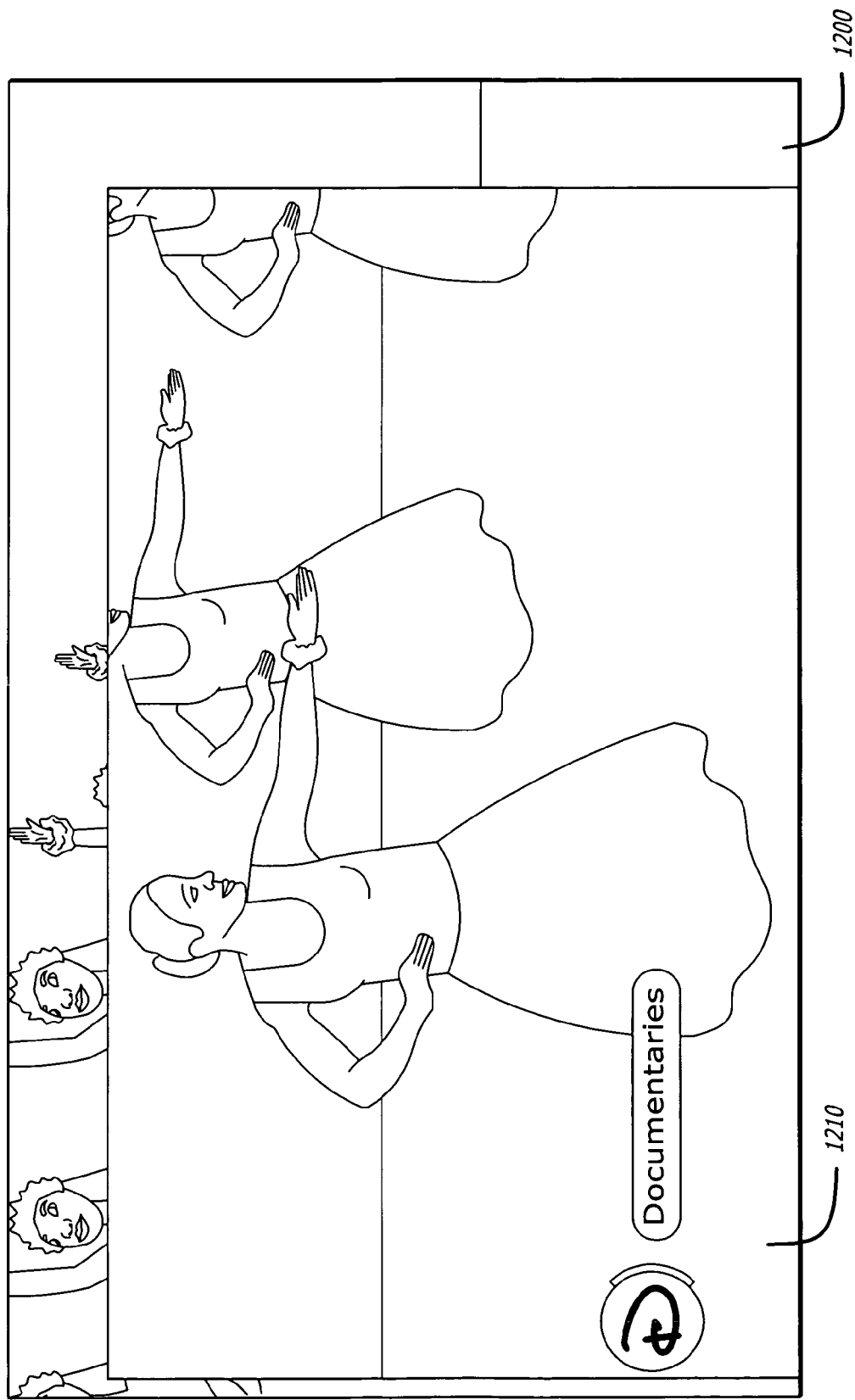

Therefore, a first stream of media data may be displayed on a video display and a secondary stream of media data may be simultaneously displayed within a smaller video sub-window on the video display. FIG. 12*a* illustrate how a user can use the remote control or mouse to resize a video sub-window. A window 1210 shows the video streaming of the selected documentary. While the video is playing in window 1210, the entire screen 1200 is displaying the primary video streaming. As further illustrated by FIG. 12*b*, the user may resize the documentary window 1210.

Figure 12C:
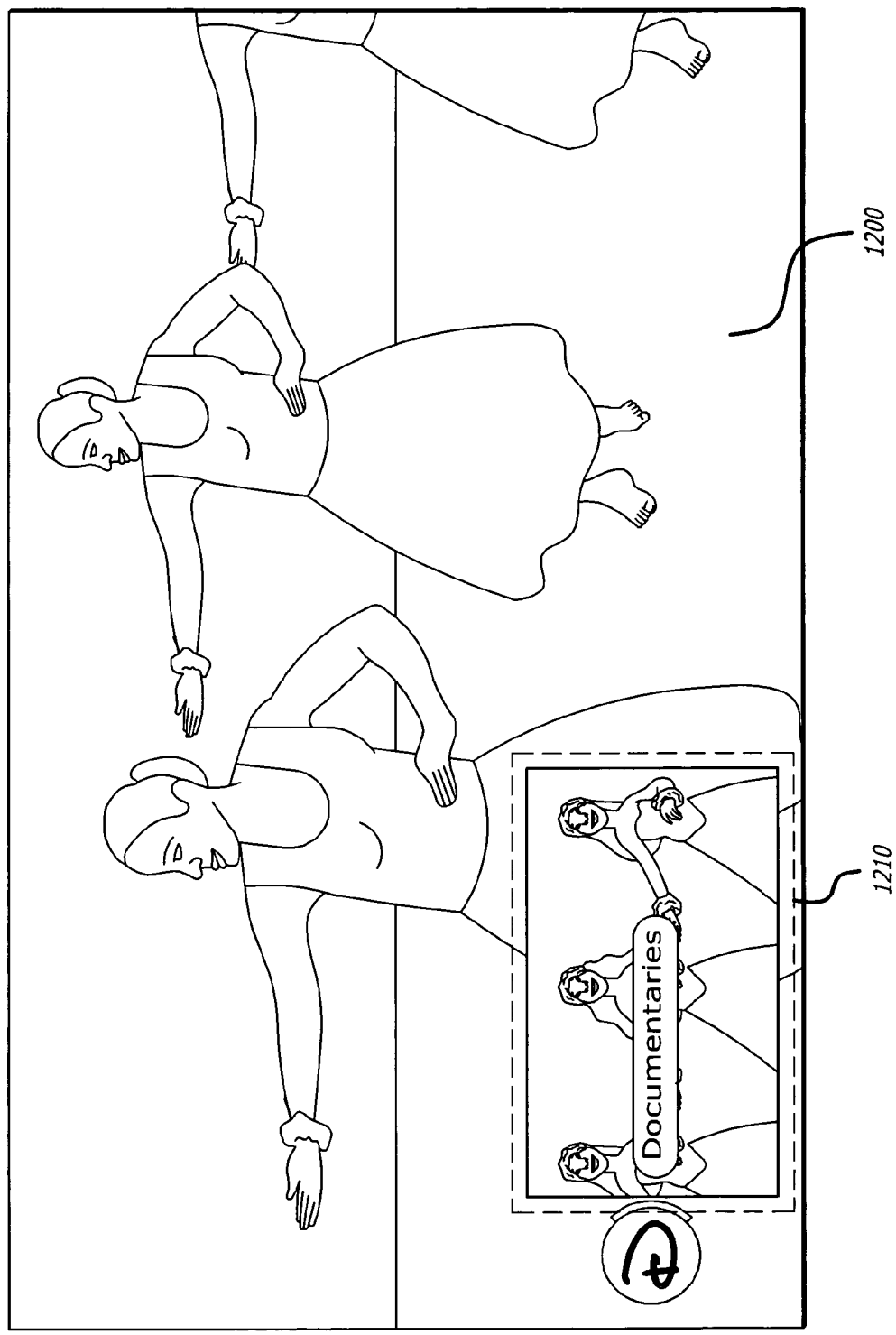

When the user watching the videos sees something interesting she may press a button on her remote control and swap the desired video feed 1210 and the main movie feed 1200. Then, as shown in FIG. 12*c*, the movie appears in the smaller window 1210 and the once-windowed track now appears full screen 1200. Furthermore, the user may guide a cursor around the video screen using a remote control, mouse or other device. By clicking and dragging on one of the small video sub-windows, one can move or resize the video until it suits her desire. As the cursor moves, the window moves smoothly along with it. All this functions may be carried out without pausing the video playback.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

What is claimed is:

1. A method of displaying scenes in a video navigation system, comprising:

playing a main video stream on a display connected to a media player;

detecting an alternate scene for a present scene of the main video stream being displayed on the display;

automatically displaying a user interface for the user to select the alternate scene by displaying a selectable thumbnail on the display, in response to the detecting of the alternate scene, wherein the selectable thumbnail includes the alternate scene being an alternate scene angle, an alternate movie plot or an alternate movie ending;

continuing the playing of the main video stream until a selection of the selectable thumbnail by the user for viewing the alternate scene.

2. The method of claim 1, comprising:

receiving the selection of the selectable thumbnail by the user for viewing the alternate scene;

starting to play a thumbnail video stream of the alternate scene portrayed in the selectable thumbnails while playing the main video stream on the display, in response to the selection.

3. The method of claim 2 further comprising:

receiving a second user selection of the selectable thumbnail;

replacing the playing of the main video stream on the display with playing the selectable thumbnail, in response to the second user selection.

4. The method of claim 2, wherein the main video stream and the thumbnail video stream are from the same video source.

5. The method of claim 2, wherein the main video stream and the thumbnail video stream are from different video sources.

6. The method of claim 1 further comprising:

receiving the selection of the selectable thumbnail by the user for viewing the alternate scene;

replacing the playing of the main video stream on the display with playing the alternate scene, in response to the user selection.

7. The method of claim 1, wherein the main video stream and the alternate scene are from the same video source.

8. The method of claim 1, wherein the main video stream and the alternate scene are from different video sources.

9. A media player for displaying scenes in a video navigation system having a display, the media player comprising:

a memory storing software instructions;
a central processing Unit (CPU) configured to execute the software instructions to:
  play a main video stream on the display connected to the media player;
  detect an alternate scene for a present scene of the main video stream being displayed on the display;
  automatically display a user interface for the user to select the alternate scene by displaying a selectable thumbnail on the display, in response to the detecting of the alternate scene, wherein the selectable thumbnail includes the alternate scene being an alternate scene angle, an alternate movie plot or an alternate movie ending;
  continue the playing of the main video stream until a selection of the selectable thumbnail by the user for viewing the alternate scene.

10. The media player of claim 9, wherein the CPU is further configured to execute the software to:
  receive the selection of the selectable thumbnail by the user for viewing the alternate scene;
  start to play a thumbnail video stream of the alternate scene portrayed in the selectable thumbnails while playing the main video stream on the display, in response to the selection.

11. The media player of claim 10, wherein the CPU is configured to execute the software to further receive a second user selection of the selectable thumbnail, and replace the playing of the main video stream on the display with playing the selectable thumbnail, in response to the second user selection.

12. The media player of claim 10, wherein the main video stream and the thumbnail video stream are from the same video source.

13. The media player of claim 10, wherein the main video stream and the thumbnail video stream are from different video sources.

14. The media player of claim 9, wherein the CPU is configured to execute the software to further receive the selection of the selectable thumbnail by the user for viewing the alternate scene, and replace the playing of the main video stream on the display with playing the alternate scene, in response to the user selection.

15. The media player of claim 9, wherein the main video stream and the alternate scene are from the same video source.

16. The media player of claim 9, wherein the main video stream and the alternate scene are from different video sources.

* * * * *